(12) United States Patent
van Eijkeren

(10) Patent No.: US 9,199,332 B2
(45) Date of Patent: Dec. 1, 2015

(54) EXPLOSIVE CLADDING OF AT LEAST TWO METAL PIPES ARRANGED WITHIN EACH OTHER

(75) Inventor: Eric Petrus Hyacinthus Maria van Eijkeren, Udenhout (NL)

(73) Assignee: SYNEX-TUBED B.V., Papendrect (NL)

( * ) Notice: Subject to any disclaimer, the term of this patent is extended or adjusted under 35 U.S.C. 154(b) by 515 days.

(21) Appl. No.: 13/504,580

(22) PCT Filed: Oct. 29, 2010

(86) PCT No.: PCT/NL2010/000157
§ 371 (c)(1),
(2), (4) Date: Oct. 15, 2012

(87) PCT Pub. No.: WO2011/053124
PCT Pub. Date: May 5, 2011

(65) Prior Publication Data
US 2013/0087240 A1    Apr. 11, 2013

(30) Foreign Application Priority Data

Oct. 30, 2009   (NL) ...................................... 1037426

(51) Int. Cl.
*B23K 20/00* (2006.01)
*B23K 20/08* (2006.01)
*F16L 9/02* (2006.01)

(52) U.S. Cl.
CPC *B23K 20/085* (2013.01); *F16L 9/02* (2013.01)

(58) Field of Classification Search
None
See application file for complete search history.

(56) References Cited

U.S. PATENT DOCUMENTS

| | | | | |
|---|---|---|---|---|
| 3,364,561 A | * | 1/1968 | Barrington | 228/108 |
| 3,740,826 A | * | 6/1973 | Baba | 228/107 |
| 3,863,327 A | * | 2/1975 | Legate et al. | 228/107 |
| 4,518,111 A | * | 5/1985 | Hardwick | 228/107 |

FOREIGN PATENT DOCUMENTS

| | | |
|---|---|---|
| DE | 1677160 A1 | 3/1970 |
| EP | 0522723 A2 | 1/1993 |
| FR | 1414510 A | 10/1965 |
| GB | 1168265 A * | 10/1969 |
| WO | WO/9316836 A1 * | 9/1993 |

OTHER PUBLICATIONS

The International Search Report in related application PCT/NL2010/000157 dated Mar. 24, 2011.

* cited by examiner

*Primary Examiner* — Kiley Stoner
(74) *Attorney, Agent, or Firm* — Troutman Sanders LLP; Ryan A. Schneider; Christopher C. Close, Jr.

(57) ABSTRACT

A method for attaching together by means of explosion welding two metal pipes (2; 3) arranged within each other, wherein a mantle of explosive material (5) is arranged around the outer pipe (2) and this mantle is made to explode in order to cause a metallurgical joint between the two pipes, according to the present invention is characterized in that the interior (4) of the inner pipe (3) is filled with granular material (6) and the interstices left free by the granular material (6) are filled with liquid (7) before the explosive material (5) is made to explode.

16 Claims, 4 Drawing Sheets

EXPLOSIVE CLADDING OF AT LEAST TWO METAL PIPES ARRANGED WITHIN EACH OTHER

CROSS-REFERENCE TO RELATED APPLICATIONS

This application is a US National Stage of International Application No. PCT/NL2010/000157, filed 29 Oct. 2010, which claims the benefit of NL 1037426, filed 30 Oct. 2009, both herein fully incorporated by reference.

FIELD OF THE INVENTION

The present invention relates in general to explosion welding.

BACKGROUND OF THE INVENTION

Explosion welding is a known per se technique for attaching together metal objects, such as plates or pipes. In short, two objects are placed on each other, and on top of that a layer of explosive material is arranged. When the explosion material is made to explode, the two objects are pressed together powerfully to such extent that they melt together in the attachment zone. A large advantage with respect to other welding techniques is that the heat input is relatively low, so that the objects as a whole do not melt and no or only a very thin mixing zone results.

A special application of explosion welding is attaching together two concentric pipes within each other, wherein the outer pipe forms a coating for the inner pipe. In such case, the explosive material is arranged around the outer pipe, and the explosion front moves along the length of the pipes. The explosion can be used to clamp the outer pipe against the inner pipe, but a metallurgical joint will result if the explosion is controlled well. In a particular embodiment, the inner pipe is made of inexpensive carbon steel and the outer pipe is made of a more expensive stainless type of material such as for instance inconel 625.

In order to have the circular pipes maintain their shape well, it is necessary that the interior of the inner pipe is filled with a medium that can resist the shock of the explosion well, and a liquid is used for this purpose because of the fact that a liquid is non-compressible. This may be a cheap liquid such as water. This process is well known on a small laboratory scale; the maximum achievable length in this case is about 50 cm. However, there is a need to apply this process in pipes having commercial lengths of 3 m or 6 m, and possibly even larger. In such case, it appears that a problem occurs in practice, of which the precise cause is not entirely clear to us, but which seems to be connected to the propagation of the shock wave in the water. The problem expresses itself in that the work piece exhibits a trumpet-like deformation: the diameter of the work piece increases as the distance to the end of the work piece decreases, i.e. seen in the direction of propagation the explosion front, and it is even possible that the work piece tears open at its end.

The invention aims to provide a solution to this problem.

BRIEF DESCRIPTION OF THE DRAWINGS

These and other aspects, features and advantages of the present invention will be further clarified by the following description with reference to the drawings, in which same reference numerals indicate same or similar parts, in which indications "under/above", "higher/lower", "left/right" etc. only indicate the orientation shown in the figures, and in which.

DETAILED DESCRIPTION OF PREFERRED EMBODIMENTS

Figure 1A:
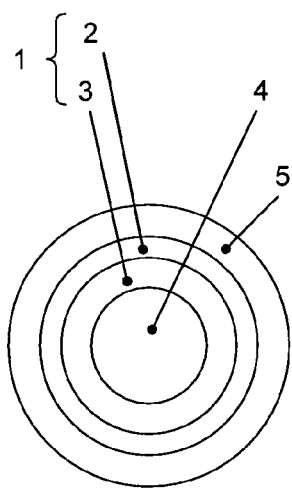
FIGS. 1A and 1B schematically show cross sections of a work piece.
Figure 1B:
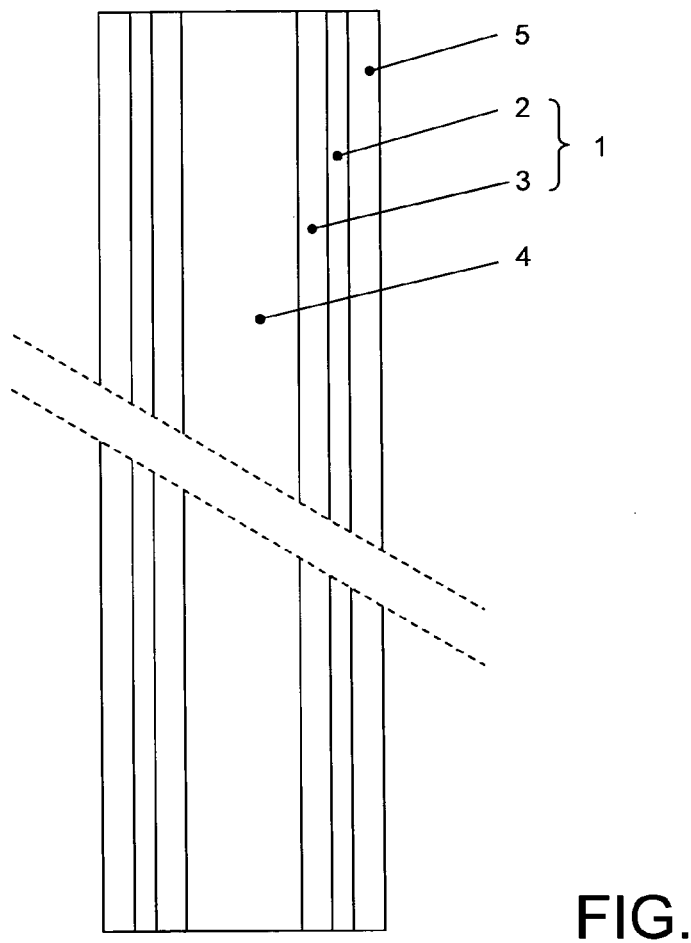
Figure 2:
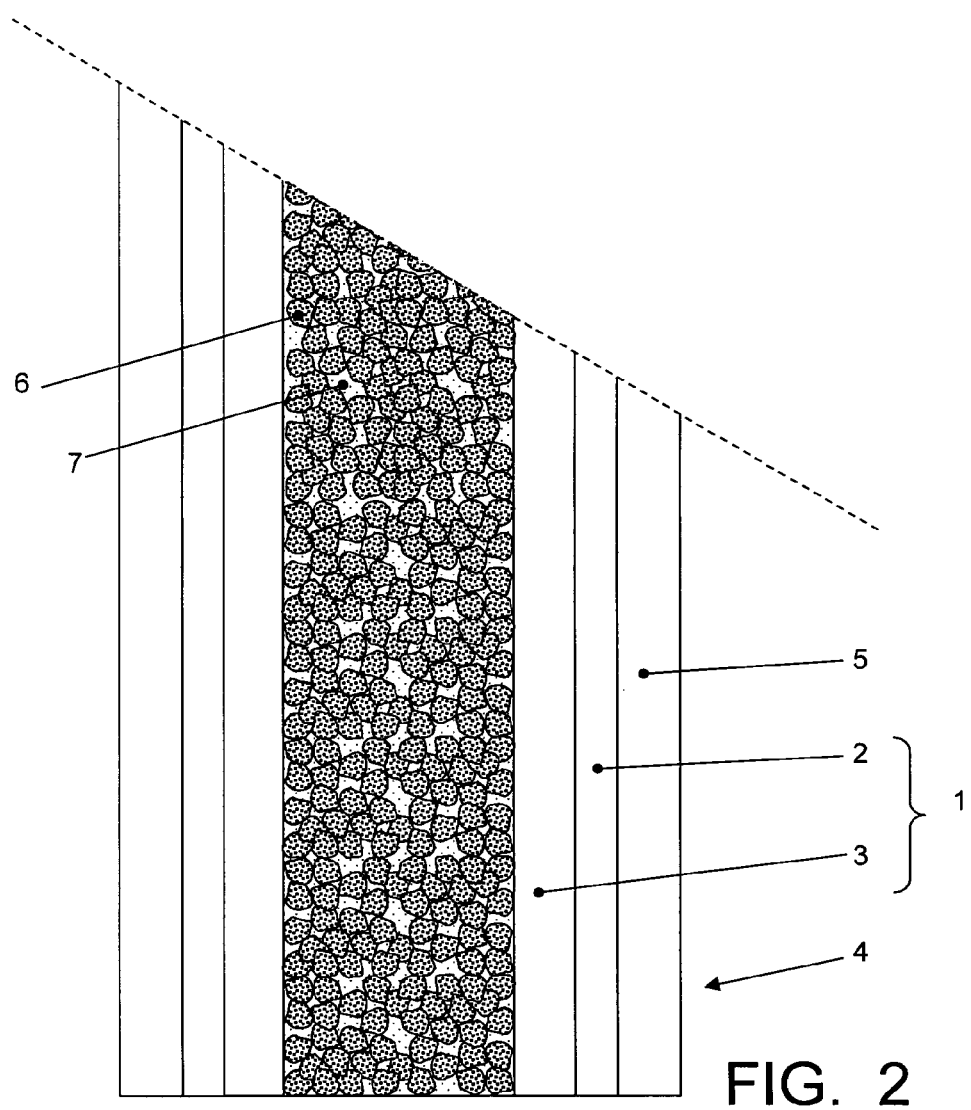
FIG. 2 shows a cross section comparable to FIG. 1B on larger scale, of a work piece according to the present invention.

FIG. 1A schematically shows a transverse cross section, and FIG. 1B schematically shows a longitudinal cross section, of a work piece 1, consisting of two pipes 2 and 3 fitting into each other. The hollow interior of the inner pipe 3 is indicated at reference numeral 4. An explosive layer 5 is arranged around the work piece 1. The pipes have a length of for instance 6 m. The diameters are not critical, but are not shown to scale. For instance, the inner pipe 3 may have an outer diameter of 5 cm and a wall thickness of 5 mm, and the outer pipe 2 may have a wall thickness of 1 mm. Any material known for explosion welding of pipes may be used as explosive material, so that it is not necessary to describe more details of this material.

When implementing the method according to the state of the art, the interior 4 of the inner pipe 3 would be filled with water before the explosive material 5 is made to explode. In fact the method can be implemented as is known in the state of the art, with the exception of the filling of the interior 4 of the inner pipe 3. According to the present invention, the interior 4 of the inner pipe 3 is first filled with a granular material 6, after which the interior 4 of the inner pipe 3 is filled with water (or another liquid).

The granular material 6 is preferably condensed well, for instance by knocking and/or vibrating and/or pressing. Preferably, the grains do not have a smooth surface, but have a rugged surface. A suitable material is for instance gravel or coarse sand. Preferably the granular material has been obtained by crumbling stony material. Otherwise it is noted that this material can be reused.

The granular material 6 forms a network of interstices connected to each other, which are filled with the water. When the explosive material 5 is made to explode, in the usual manner, the water (or other liquid) 7 in the interior 4 will still function as non-compressible backing. However, the water will not easily be able to displace itself in the labyrinth of interstices so that the consequences of a pressure wave are reduced or even avoided entirely.

Figure 3:
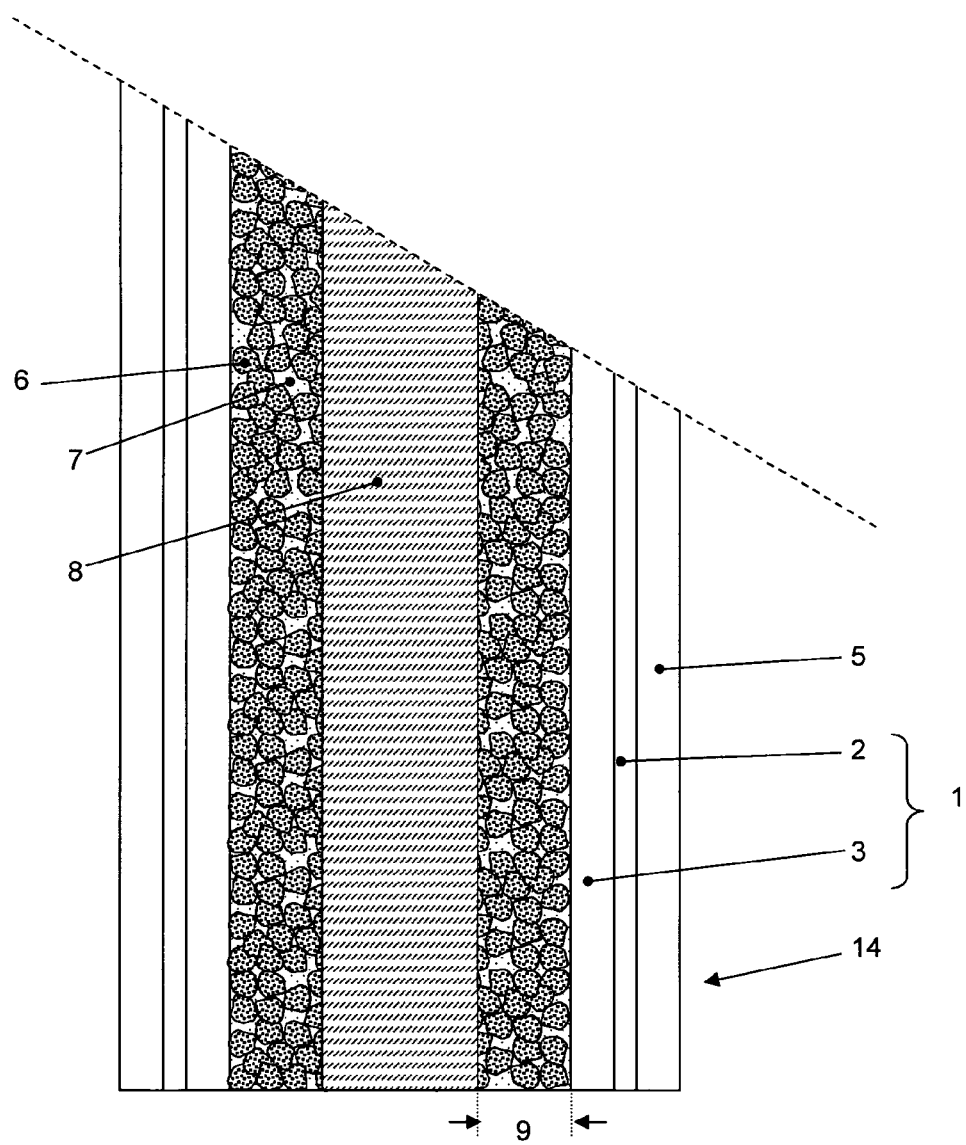
FIGS. 3 and 4 illustrate some variations of the present invention.

The present invention can be applied with pipes within a large range of diameters, actually without the diameter forming a restriction. Obviously, in the case of larger diameters also the diameter of the hollow space 4 is larger, and that means that a larger amount of the granular material is needed (this amount scales with the square of the radius). In such case, it might happen that the total package of granular material is still compressed slightly by the explosion. Therefore, in a further elaboration, the present invention proposes to arrange a solid inner core 8 centrally in the hollow space 4, which may possibly but not necessarily be made of steel. This embodiment variation is illustrated in FIG. 3. The space 14 filled with the granular material 6 between the inner core 8 and the inner wall of the inner pipe 3 now has an annular contour; the diameter of the inner core 8 is preferably selected in such a way that the thickness of this annular space 14 (indicated at 9 in FIG. 3) is in the order of about 2.5 cm.

Figure 4:
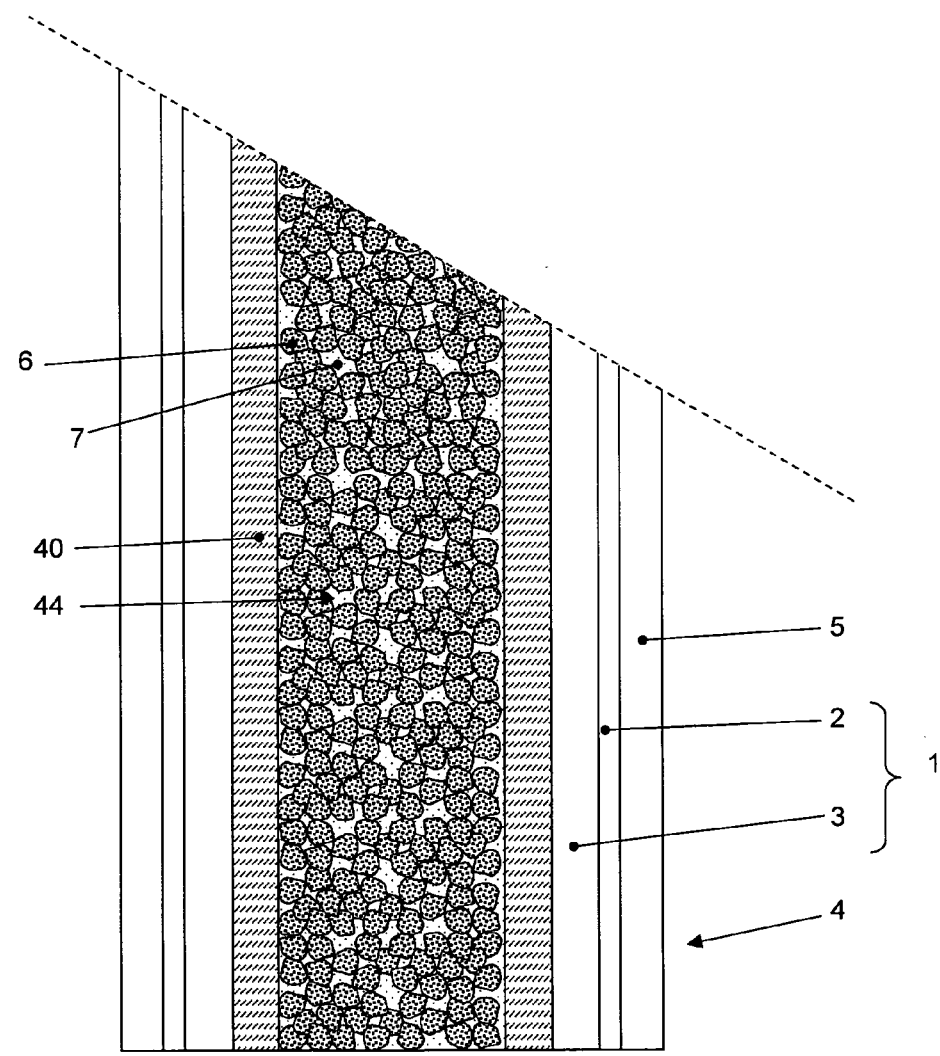

FIG. 4 illustrates a variation wherein a hollow pipe 40 is filled in advance with granular material 6 and liquid 7, and then this filled pipe 40 is arranged in the hollow space 4 of the inner pipe 3. The pipe 40 can be made of a plastic. An advantage of this variation is that filling the pipe 40 can be done in advance, so that loading the pipes 2 and 3 on site can go faster.

It will be clear to a person skilled in the art that the invention is not limited to the exemplary embodiments discussed in the above, but that several variations and modifications are possible within the protective scope of the invention as defined in the attached claims. For instance, it is possible that the outer pipe is made of an inexpensive type of steel while the inner pipe is made of a more expensive stainless type of material, in which case the inner pipe will then typically have a smaller thickness (for instance 1 mm) than the outer pipe (for instance 5 mm): in this way, the inner surface of the inexpensive steel pipe is then provided with a high quality coating. It is also possible that an inexpensive steel pipe is provided with a high quality coating on both its inner surface and its outer surface by placing three pipes in each other.

In the above it has been described that the pipes 2 and 3 are first placed within each other and then the interior 4 of the inner pipe 3 is filled with granular material. It is also possible that the interior 4 of the inner pipe 3 is first filled with granular material and then the filled inner pipe 3 is arranged within the outer pipe 2.

The invention claimed is:

1. Method for attaching at least two metal pipes arranged within each other comprising:
    filling an inner pipe with granular material;
    condensing the granular material;
    after the step of condensing, filling the interstices left free by the granular material with a liquid;
    arranging around an outer pipe a mantle of explosive material; and
    exploding the mantle in order to cause a metallurgical joint between the two pipes.

2. Method according to claim 1, wherein the granular material comprises at least one of gravel and sand.

3. Method according to claim 1 further comprising crushing stone material to obtain the granular material.

4. Method according to claim 1, wherein the liquid comprises water.

5. Method for attaching at least two metal pipes arranged within each other comprising:
    placing within an inner pipe a solid inner core;
    after the step of placing, filling the inner pipe with granular material;
    filling the interstices left free by the granular material with a liquid;
    arranging around an outer pipe a mantle of explosive material; and
    exploding the mantle in order to cause a metallurgical joint between the two pipes.

6. Method for attaching at least two metal pipes arranged within each other comprising:
    filling a hollow pipe with granular material and a liquid, the liquid filling the interstices left free by the granular material;
    arranging the filled pipe within the interior of an inner pipe;
    arranging around an outer pipe a mantle of explosive material; and
    exploding the mantle in order to cause a metallurgical joint between the inner and outer pipes.

7. Method according to claim 1, wherein condensing the granular material comprises one or more of knocking, vibrating, and pressing.

8. Method according to claim 1, wherein the granular material defines a labyrinth of interconnected interstices; and
    wherein when the explosive material is made to explode, the liquid is uncompressible and the granular material is configured such that a pressure wave in the liquid is at least reduced by the labyrinth of interstices.

9. Method according to claim 5, wherein the granular material comprises at least one of gravel and sand.

10. Method according to claim 5 further comprising crushing stone material to obtain the granular material.

11. Method according to claim 5, wherein the liquid comprises water.

12. Method according to claim 5, wherein the granular material defines a labyrinth of interconnected interstices; and
    wherein when the explosive material is made to explode, the liquid is uncompressible and the granular material is configured such that a pressure wave in the liquid is at least reduced by the labyrinth of interstices.

13. Method according to claim 6, wherein the granular material comprises at least one of gravel and sand.

14. Method according to claim 6 further comprising crushing stone material to obtain the granular material.

15. Method according to claim 6, wherein the liquid comprises water.

16. Method according to claim 6, wherein the granular material defines a labyrinth of interconnected interstices; and
    wherein when the explosive material is made to explode, the liquid is uncompressible and the granular material is configured such that a pressure wave in the liquid is at least reduced by the labyrinth of interstices.

* * * * *